(12) United States Patent
Frisk

(10) Patent No.: US 6,265,038 B1
(45) Date of Patent: *Jul. 24, 2001

(54) TRANSPARENT HIGH BARRIER MULTILAYER STRUCTURE

(75) Inventor: Peter Frisk, Chicago, IL (US)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,252

(22) Filed: Jan. 27, 1999

Related U.S. Application Data (60) Division of application No. 08/818,116, filed on Mar. 14, 1997, now Pat. No. 5,916,685, which is a continuation-in-part of application No. 08/677,282, filed on Jul. 9, 1996, now Pat. No. 5,876,812.

(51) Int. Cl.[7] .............................. B65D 30/16; B65D 25/40
(52) U.S. Cl. ..................... 428/34.7; 428/35.7; 428/195; 428/204; 428/210; 428/329; 428/331; 428/338; 428/339; 428/435; 428/448; 428/451; 428/477.7; 428/480; 383/104; 383/107; 383/120; 383/205; 383/906; 222/566
(58) Field of Search ................................. 428/34.4, 34.5, 428/34.7, 35.7, 195, 210, 204, 339, 338, 340, 480, 477.7, 451, 220, 448, 435, 328, 331, 329; 383/104, 120, 107, 205, 906; 222/566, 572, 573

(56) References Cited

U.S. PATENT DOCUMENTS

| | | | |
|---|---|---|---|
| 4,810,734 | 3/1989 | Kawasumi et al. ................... 523/216 |
| 4,889,885 | 12/1989 | Usuki et al. ........................... 524/445 |
| 5,006,405 | * 4/1991 | Watkins et al. ....................... 428/323 |
| 5,018,646 | * 5/1991 | Billman et al. ....................... 222/107 |
| 5,059,035 | * 10/1991 | Kristensen ............................. 383/33 |
| 5,085,904 | * 2/1992 | Deak et al. ........................... 428/35.7 |
| 5,102,948 | * 4/1992 | Deguchi et al. ...................... 524/789 |
| 5,122,410 | * 6/1992 | Lofgren et al. ....................... 428/216 |
| 5,164,440 | 11/1992 | Dequchi et al. ..................... 524/444 |
| 5,164,460 | 11/1992 | Yano et al. ........................... 524/445 |
| 5,248,720 | 9/1993 | Dequchi et al. ..................... 524/444 |
| 5,322,889 | 6/1994 | Yamamoto et al. .................. 524/789 |
| 5,376,604 | 12/1994 | Iwasaki et al. ....................... 501/146 |
| 5,384,196 | 1/1995 | Inoue et al. ........................ 428/411.1 |
| 5,385,776 | 1/1995 | Maxfield et al. .................. 428/297.4 |
| 5,876,812 | * 3/1999 | Frisk et al. ........................... 428/35.7 |
| 5,916,685 | * 6/1999 | Frisk .................................... 428/446 |
| 5,937,617 | * 8/1999 | Yeager .................................. 53/412 |
| 5,971,613 | * 10/1999 | Bell ...................................... 383/107 |
| 5,972,448 | * 10/1999 | Frisk et al. ........................... 427/35.7 |

* cited by examiner

Primary Examiner—Rena L. Dye
(74) Attorney, Agent, or Firm—Welsh & Katz (57) ABSTRACT

A transparent multilayer structure is disclosed such as a flexible self-supporting container for a flowable food product such as fruit juice. The transparent multilayer structure possesses superior barrier properties to oxygen, water vapor and aromatic gases. The multilayer structure may include an exterior layer having a metal oxide deposition laminated to an interior layer through use of an adhesive. In one embodiment, the metal oxide is SiOx where x has a value between 1.5 and 2.2 thereby allowing for a transparent multilayer structure. The metal oxide may be deposited on the exterior layer through a number of various methods. An exemplary method is plasma-enhanced chemical vapor deposition. The exterior layer may be composed of a polymer material integrated with a clay mineral between 0.1% and 10% weight of the polymer material. The polymer material may be selected from the group consisting of polyamide, polyethylene terephthalate, copolymers of polyethylene terephthalate and mixtures thereof.

14 Claims, 10 Drawing Sheets

TRANSPARENT HIGH BARRIER MULTILAYER STRUCTURE

CROSS REFERENCES TO RELATED APPLICATIONS

This application is divisional application of U.S. patent application Ser. No. 08/818,116, filed on Mar. 14, 1997, now U.S. Pat. No. 5,916,685, which is a continuation-in-part of U.S. patent application Ser. No. 08/677,282 filed on Jul. 9, 1996, now U.S. Pat. No. 5,876,812.

STATEMENT REGARDING FEDERALLY SPONSORED RESEARCH OR DEVELOPMENT

Not Applicable

BACKGROUND OF THE INVENTION

1. Field of the Invention

The present invention relates to transparent high barrier multilayer structures. Specifically, the present invention relates to a transparent high barrier pouch composed of a multilayer film structure having at least one layer of a polymer with a metal oxide deposition thereon.

2. Description of the Related Art

High barrier flexible materials for packaging strive for glass-like properties without the weight associated with glass containers. Many inventions have been developed which attempt to reach this "Holy Grail" of the packaging industry. For example, Löfgren et al, U.S. Pat. No. 5,122,410, for a Laminated Packing Material With Gas and Aroma Barrier Properties discloses a laminate of two thermoplastic layers, each coated with a silicon compound, bonded together by an intermediate layer of an adhesive agent. The silicon compound may be $SiO_2$ which provides good gas and aroma barrier properties for packages fabricated from the laminate.

Deak et al, U.S. Pat. No. 5,085,904 for Barrier Materials Useful For Packaging discloses a multilayer structure of a 10–75 nanometer thick layer of SiO vacuum deposited on a resin substrate of either polyester or polyamide with at least a 20 nanometer thick layer of $SiO_2$ vacuum deposited on the SiO layer. Deak et al specifically teaches "the necessity of the $SiO/SiO_2$ multilayer combination in terms of barrier properties." Deak et al further teaches that "it is essential that some thickness of SiO layer be present, since it is the combination of resin substrate and the SiO and $SiO_2$ layers that provides the desirable barrier properties." Deak et al also teaches that the use of SiO will impart a yellow coloration which may not be perceptible if the SiO layer is very thin. However, at these small thickness the SiO layer provides virtually no barrier properties unless combined with a $SiO_2$ layer. Deak et al also teaches that the use of $SiO_2$ alone is limited due to decreasing flexibility with increasing thickness. Thus, according to Deak et al, only a multilayer structure of a 10–75 nanometer thick layer of SiO vacuum deposited on a resin substrate of either polyester or polyamide with at least a 20 nanometer thick layer of $SiO_2$ vacuum deposited on the SiO layer will exhibit sufficient barrier properties with an acceptable flexibility.

The foregoing patents, although efficacious in the protection of their contents, are not the denouement of the problems of the packaging industry. There are still unresolved problems which compel the enlargement of inventions in the packaging industry.

BRIEF SUMMARY OF THE INVENTION

The present invention is the next step toward a glass-like flexible material. The transparency of the flexible material allows one to view the contents of the packaging while the high barrier properties virtually prevent the ingress of gases into the packaging.

One aspect of the present invention is a transparent multilayer structure. The structure is composed of an exterior film, a metal oxide deposited on the exterior film and an interior film. The exterior film is composed of a polymer material integrated with a clay mineral between 0.1% and 10% weight of the polymer material. The polymer material is selected from the group consisting of polyamide, polyethylene terephthalate, copolymers of polyethylene terephthalate and mixtures thereof. The exterior film may be unoriented, mono-oriented or biaxially oriented. The clay mineral may be selected from the group consisting of smectite, vermiculite, halloysite, and any synthetic analog thereof. The clay mineral may also be a plurality of clay particles with each of the clay particles having a thickness of between 9 Angstroms and 100 nanometers and an aspect ratio of between 100 and 2000. The metal oxide deposition on the exterior film has a thickness range of approximately 5 to 500 nanometers and has a formula of $MO_x$ where x has a range of approximately 1.5 to approximately 2.5. M is selected from the group consisting of silicon, aluminum and iron. The interior film is juxtaposed to the metal oxide deposition.

The exterior film may also be a print layer. The structure may have a signage printed on the metal oxide deposition. The exterior film may have a thickness range of approximately 8 to approximately 20 microns. The interior film may have a thickness range of approximately 25 to approximately 150 microns. The interior film may be laminated to the exterior film and metal oxide deposition through utilization of an adhesive. The structure may be a container for flowable materials. The structure may be a laminate. The metal oxide deposition is deposited onto the exterior film through a process selected from the group consisting of plasma-enhanced chemical vapor deposition, metalorganic chemical vapor deposition, halide transport chemical vapor deposition, liquid atmospheric photo chemical deposition, electron beam evaporation, pulsed laser ablation, atomic layer epitaxy, ion implantation, molecular beam epitaxy and RF magnetron sputtering.

The interior film may be selected from the group consisting of linear low density polyethylene, ultra low density polyethylene, metallocene linear low density polyethylene, low density polyethylene, medium density polyethylene, high density polyethylene, polypropylene, copolymers of polypropylene, copolymers of ethylene vinyl acetate and mixtures thereof.

Another aspect of the present invention is a self-supporting transparent container for flowable materials. The self-supporting transparent container is composed of an exterior film, a metal oxide deposited on the exterior film, an interior film and a flexible gusseted panel secured to a marginal portion of a plurality of side walls of the container and folded inwardly therebetween. The exterior film is composed of a polymer material integrated with a clay mineral between 0.1% and 10% weight of the polymer material. The polymer material is selected from the group consisting of polyamides, polyethylene terephthalate, copolymers of polyethylene terephthalate and mixtures thereof. The metal oxide deposition on the exterior film has a thickness range of approximately 5 to 500 nanometers and has a formula of $MO_x$ where x has a range of approximately 1.5 to approximately 2.5. M is selected from the group consisting of silicon, aluminum and iron. The interior film is juxtaposed to the metal oxide deposition.

The exterior film may also be a print layer The structure may have a signage printed on the metal oxide deposition. The exterior film may have a thickness range of approximately 8 to approximately 20 microns. The interior film may have a thickness range of approximately 25 to approximately 150 microns. The interior film may be laminated to the exterior film and metal oxide deposition through utilization of an adhesive.

The self-supporting transparent container may also include a transverse seal having an unsealed area of a predetermined configuration. The transverse seal may have a tear notch for exposing the unsealed area while partially maintaining the transverse seal. The exposed unsealed area permits the placement of an insert for removing the contents of the self-supporting transparent container. The insert corresponds in shape to the predetermined configuration of the unsealed area. The insert may have an elongated body with an aperture therethrough. The elongate body has an insert portion for penetration to the contents, a breaking portion, a spout portion, and a knob.

It is a principal object of the present invention to provide a high barrier material for packaging. It is another object of the present invention to provide a flowable container composed of a high barrier material wherein the container may be a pillow pouch, a stand-up pouch, a gusseted bottom container, a self-supporting container, and the like.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a cross-sectional view of one embodiment of a laminate suitable for use in forming a container for flowable materials.

There is illustrated in FIG. 2 a perspective view of a self-supporting transparent container of the present invention.

There is illustrated in FIG. 3 a perspective view of an insert placed within a self-supporting transparent container of the present invention.

There is illustrated in FIG. 4 a partial view of a self-supporting transparent container of the present invention with an unsealed area There is illustrated in FIG. 5 a side view of an insert utilized in conjunction with a self-supporting transparent container of the present invention.

There is illustrated in FIG. 6 a side view of an insert utilized in conjunction with a self-supporting transparent container of the present invention.

There is illustrated in FIG. 7 a graph of the Gelbo Flex testing of three flexible barrier materials.

There is illustrated in FIG. 8 a graph of the oxygen permeation versus humidity for PET/SiOx compared to EVOH.

There is illustrated in FIG. 9 a graph of oxygen permeation versus PET/MOx film elongation for three flexible barrier materials.

There is illustrated in FIG. 10 a graph of oxygen permeation versus temperature for PET/SiOx compared to PVDC.

DETAILED DESCRIPTION OF THE INVENTION

The packaging of liquid food products such as fruit juices has assumed various forms for aesthetic and functional purposes. Packaging should be non-scalping so as not to impoverish the contents of its aromatic flavorings and essential oils. Packaging should be a barrier to gases such as oxygen to prevent oxidation of the contents, and an aroma barrier. Packaging should also be durable to withstand distribution from a packaging site to a retail site. Packaging should also be pleasing to the consumer in order to entice the consumer to purchase the product.

One age-old method of aesthetic packaging is the transparent glass bottle which allows the consumer to view the contents prior to purchase. In this manner, the consumer may verify that the contents are not contaminated and have not degraded to an unacceptable by-product. However, the weight of a glass bottle is unacceptable for today's packaging needs. The transparent multilayer structure of the present invention provides many of the barrier, durability and aesthetic properties of the glass bottle without the unnecessary weight. The novel transparent multilayer structure of the present invention provides almost crystal clear transmission of light while maintaining the barrier and durability properties necessary for today's packaging.

Figure 1:
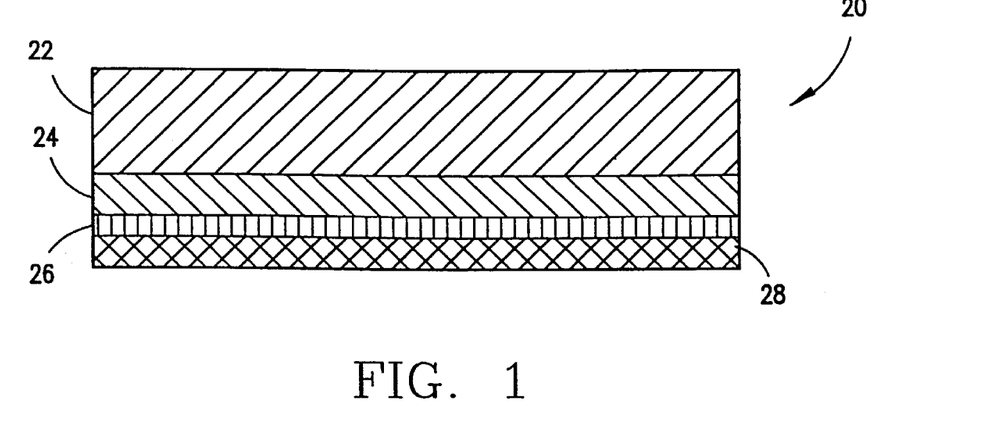

There is illustrated in FIG. 1 a cross-sectional view of one embodiment of a laminate suitable for use in forming a container for flowable materials. As shown in FIG. 1, the laminate 20 is generally composed of an exterior film 22, a metal deposition 24, an adhesive 26 and an interior film 28. The laminate 20 is transparent, durable and a barrier to various gases including oxygen.

The exterior film 22 is composed of a polymer material integrated with a clay mineral between 0.1% and 10% weight of the polymer material. The polymer material selected from the group consisting of polyamides (PA) polyethylene terephthalate ("PET"), copolymers of polyethylene terephthalate ("COPET") and mixtures thereof. The clay mineral is selected from the group consisting of smectite, vermiculite, halloysite, and any synthetic analog thereof. The clay mineral is a plurality of clay particles with each of the clay particles having a thickness of between 9 Angstroms and 100 nanometers, and an aspect ratio of between 100 and 2000. The "nanocomposite" material provides increased barrier performance over a standard PET material. Such a material is described in copending application Ser. No. 08/677,282 which was filed on Jul. 9, 1996, now U.S. Pat. No. 5,876,812, entitled "Nanocomposite Polymer Container" which relevant parts are hereby incorporated by reference. The exterior film may be unoriented, mono-oriented or biaxially oriented. The metal deposition 24 may have the formula $MO_x$ where x has a range of approximately 1.5 to approximately 2.5. M may be silicon, aluminum or iron, with a preference for silicon. The interior film 28 may be selected from the group consisting of linear low density polyethylene, ultra low density polyethylene, metallocene linear low density polyethylene, low density polyethylene, medium density polyethylene, high density polyethylene, polypropylene, copolymers of polypropylene, copolymers of ethylene vinyl acetate (EVA) and mixtures thereof Various adhesives are suitable as the adhesive layer 26 for joining the interior film 28 to the exterior film 22 and metal deposition 24. For example, a solvent-based adhesive available from Novacote and a solvent free adhesive from Novacote may be used in the present invention. A modified ethylene copolymer or a polyurethane adhesive may be used for this purpose. One polyurethane adhesive suitable for such use is sold by Novacote International of Hamburg, Germany. A modified ethylene copolymer is BYNEL CXA sold by DuPont.

If dry lamination is employed, wherein the adhesive layer 26 is coextruded with interior film 28, then possible adhesive are EVA, EMA, EBA, EAA, and the like. A possible EVA is ELVAX and a possible EMA is BYNEL, both available from DuPont. A possible EAA is ESCOR available from Exxon Chemical. In dry laminating the exterior film 22 with the metal deposition 24 to the interior film 28 and the adhesive layer 26, a hot nip roller may be employed to fabricate the laminate.

The exterior film 22 may have a thickness range of approximately 8 to 20 microns. The interior film 28 may have a thickness of approximately 25 to 150 microns. The metal oxide deposition 24 may have a thickness range of approximately 5 to 500 nanometers. The stoichiometry of the metal oxide is important to maintain the transparency and the high barrier properties of the multilayer structure 20. In the formula MOx where M is either aluminum, silicon or iron, and x is between 1.8 and 2.5, the ability to deposit the metal oxide within this stoichiometric range prevents the multilayer structure from becoming tinged thereby loosing its transparency. For example, when M is silicon and x is near 1.0, the multilayer structure will have a yellow tinge indicative of silicon oxide, a semiconductor which has a relatively narrow electron band gap between a filled valence band and an empty conduction band thereby allowing for the absorption of light. Whereas when M is silicon and x is near 2, the metal deposition is silicon dioxide, an insulator which has a relatively large electron band gap between a filled valence band and an empty conduction band thereby allowing for the transmission of light. Thus, it is very important that the deposition of the metal oxide be performed in a manner that will ensure this stoichiometric range in order to have the transparency as well as the expected barrier properties as further illustrated in the graphs at FIGS. 7–10.

The metal oxide deposition 24 may be deposited on the exterior film 22 through a number of deposition methods. These methods include plasma-enhanced chemical vapor deposition, metalorganic chemical vapor deposition, halide transport chemical vapor deposition, liquid atmospheric photo chemical deposition, electron beam evaporation, pulsed laser ablation, atomic layer epitaxy, ion implantation, molecular beam epitaxy and RF magnetron sputtering. A preferred deposition method is plasma enhanced chemical vapor deposition described in Fayet et al, U.S. Pat. No. 5,531,060 which pertinent parts are hereby incorporated by reference. However, it will be apparent to those skilled in the pertinent art that other deposition methods may be employed while not departing from the scope of the present invention.

Referring still to FIG. 1, a preferred embodiment of the laminate 20 may have the exterior film 22 composed of a biaxially oriented PET with a silicon oxide deposition 24 having the following stoichiometry, SiOx, where x has value between 1.5 and 2.5. In this preferred embodiment, the interior film 26 is composed of a blend of LLDPE and LDPE.

Figure 2:
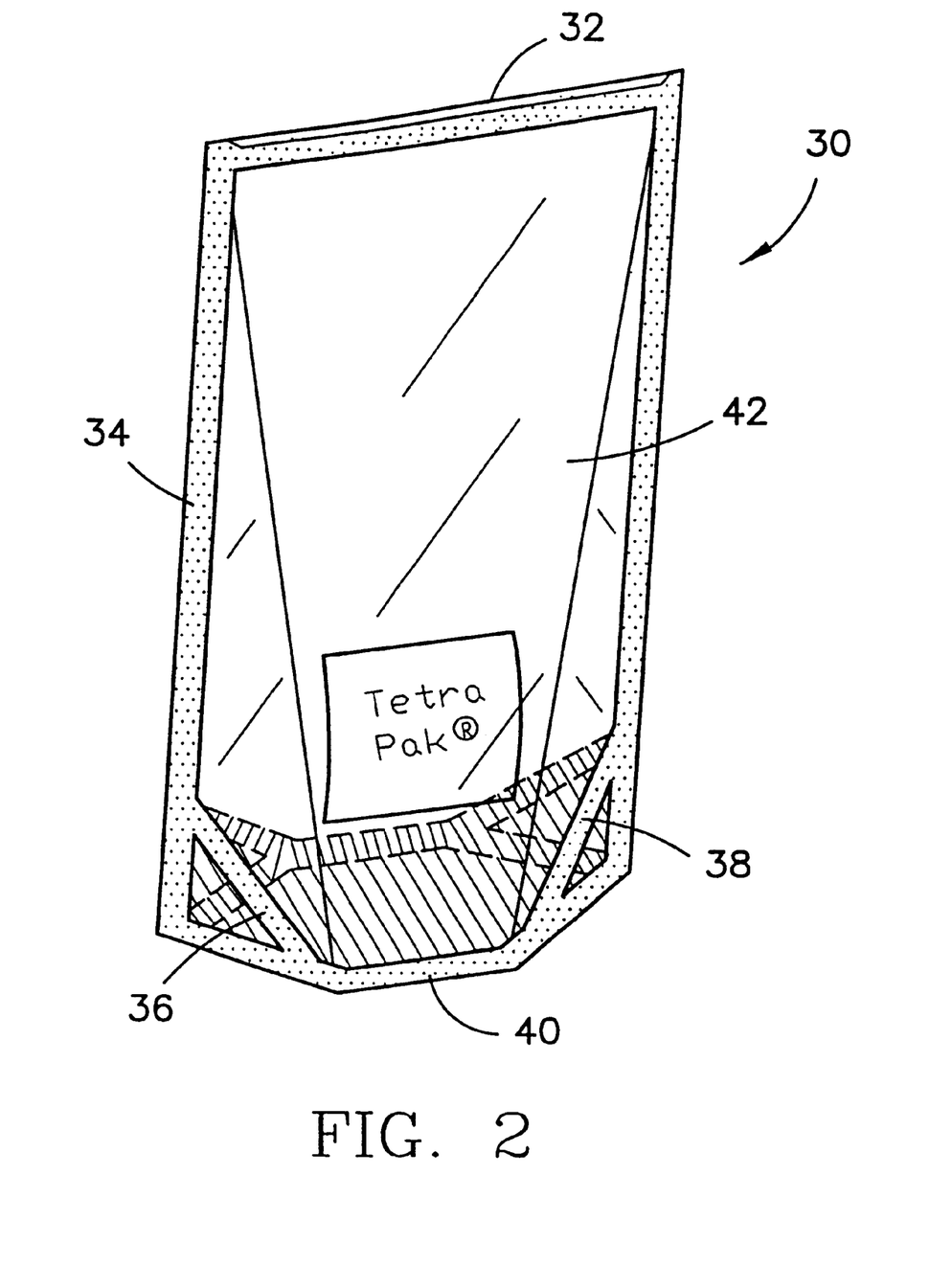

There is illustrated in FIG. 2 a perspective view of the self-supporting transparent container of the present invention. As shown in FIG. 2, the container 30 has a upper transverse seal 32, a longitudinal seal 34, a first oblique seal 36 and a second oblique seal 38 and a bottom seal 40. The interior 42 of the container 30 contains a flowable material such as a pumpable food. One particular use of the container 30 is for juices.

The container 30 is transparent except for any signage 44 which may be added to indicate the contents or source of the contents. The signage 44 may be created by reverse printing on the metal deposition 24 of the laminate 20. Also, Flexo, Roto and Offset printing methods may be employed. However, those skilled in the art will recognize that other printing methods may be employed without departing from the scope or spirit of the present invention. The signage 44 may be placed at any desired position on the container 30 and may be of any size or shape. The self-supporting transparent container 30 may be fabricated on a vertical form, fill and seal machine. However, those skilled in the art will recognize that the container 30 may be fabricated on many types of machines without departing from the scope of the present invention.

Figure 3:
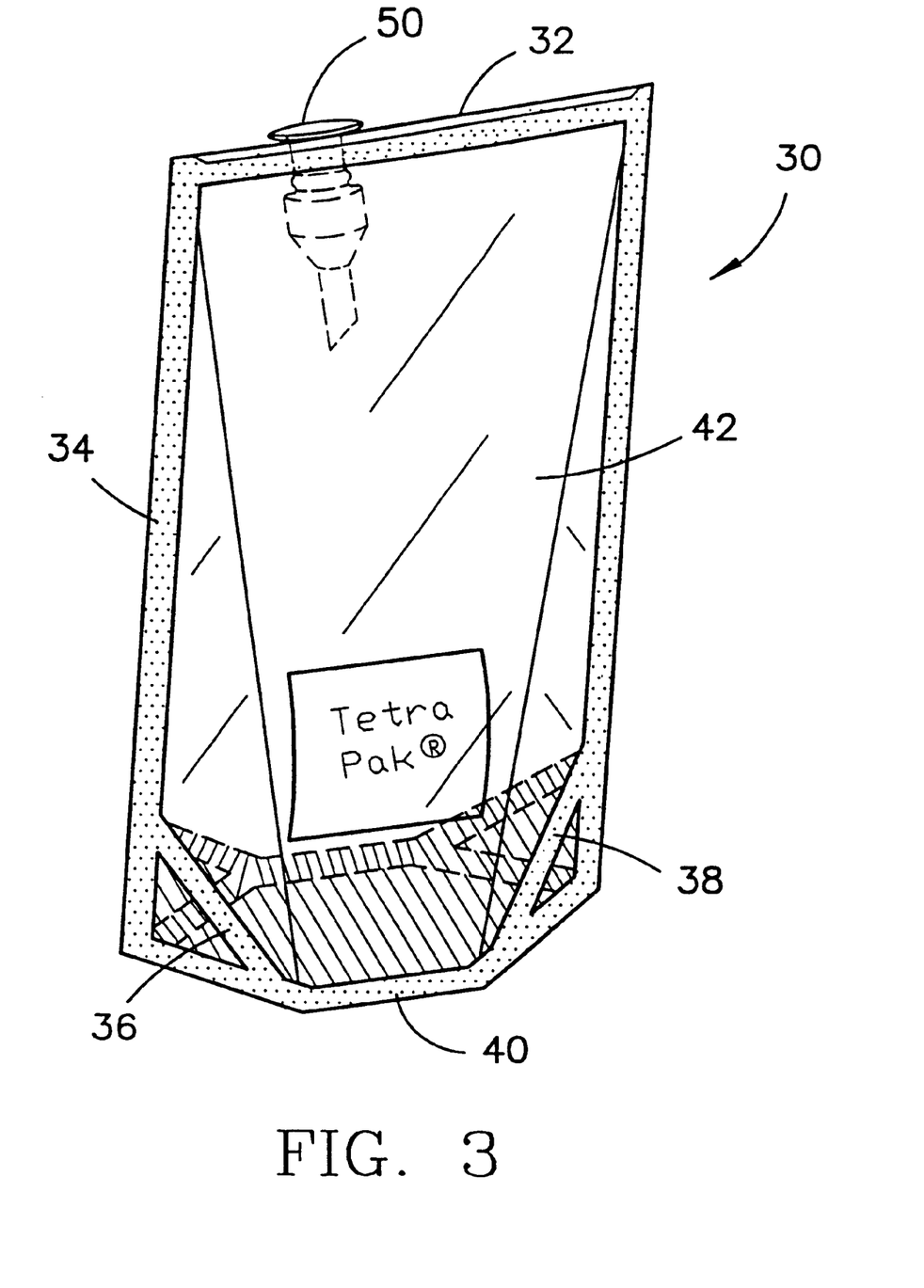

There is illustrated in FIG. 3 a perspective view of an insert placed within a self-supporting transparent container of the present invention. The insert 50 is placed through the top of the container 30 to reach the contents in the interior 42. The insert 50 is positioned through an opening in the container 30, explained below, in a manner which forms a liquid tight seal thereby preventing spillage of the contents of the container 30.

Figure 4:
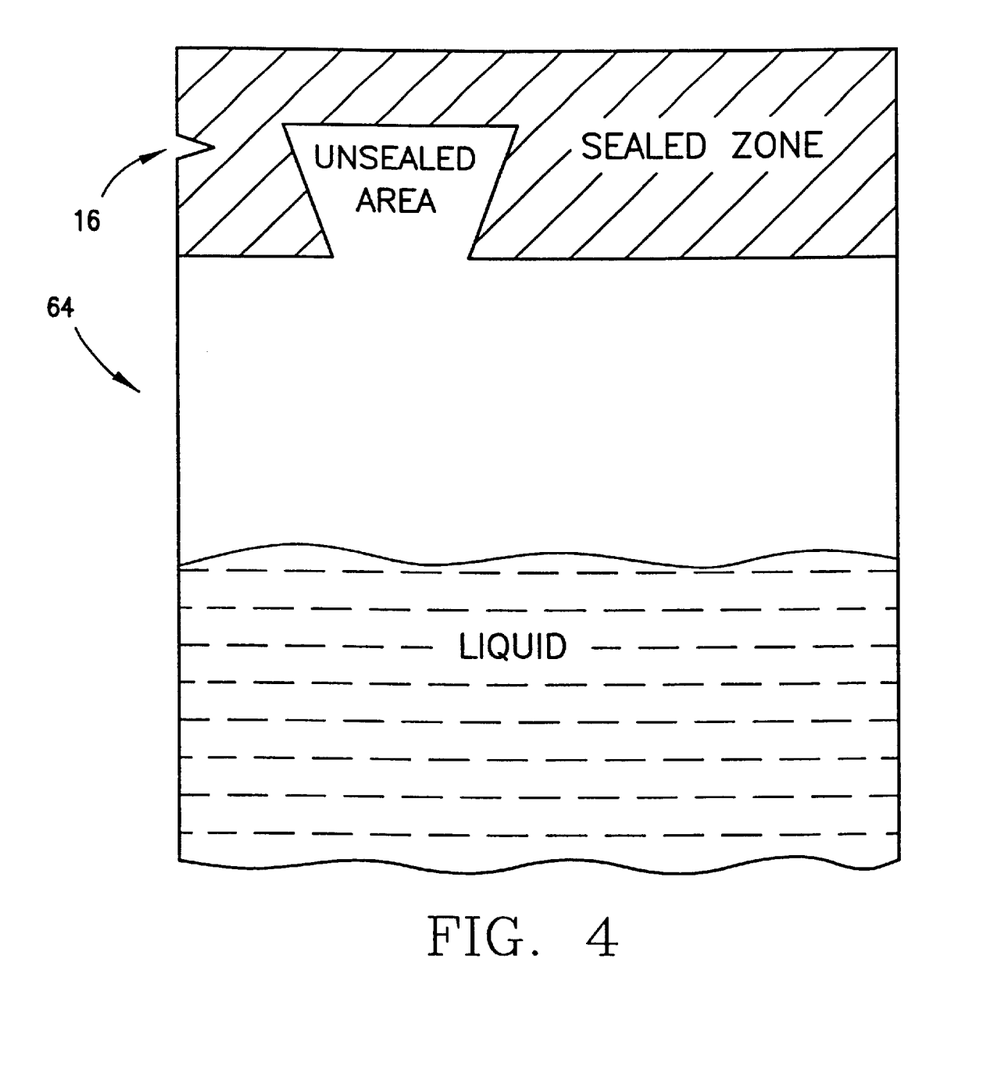

There is illustrated in FIG. 4 a partial view of a self-supporting transparent container of the present invention with an unsealed area. As shown in FIG. 4, the transverse seal 32 has an unsealed area 64 for placement of the insert 50 therethrough. The transverse seal 32 also has a tear notch 66 for partially tearing open the seal to reveal the unsealed area 64. When in use, the transverse seal 32 close to the notch 66 is first torn by the consumer. This tear propagates into the unsealed area 64 which now forms an opening into the package. The unsealed area 64 has a larger diameter at the top which decreases as the unsealed area 64 approaches the contents portion of the container 30. The diameter at the bottom of the unsealed area 64 may be designated D1. The insert 50 may be positioned into the opening/unsealed area 64 to access the contents of the package. A specially designed heat sealing bar, not shown, fabricates the transverse seal 32 having the unsealed area 64.

Figure 5:
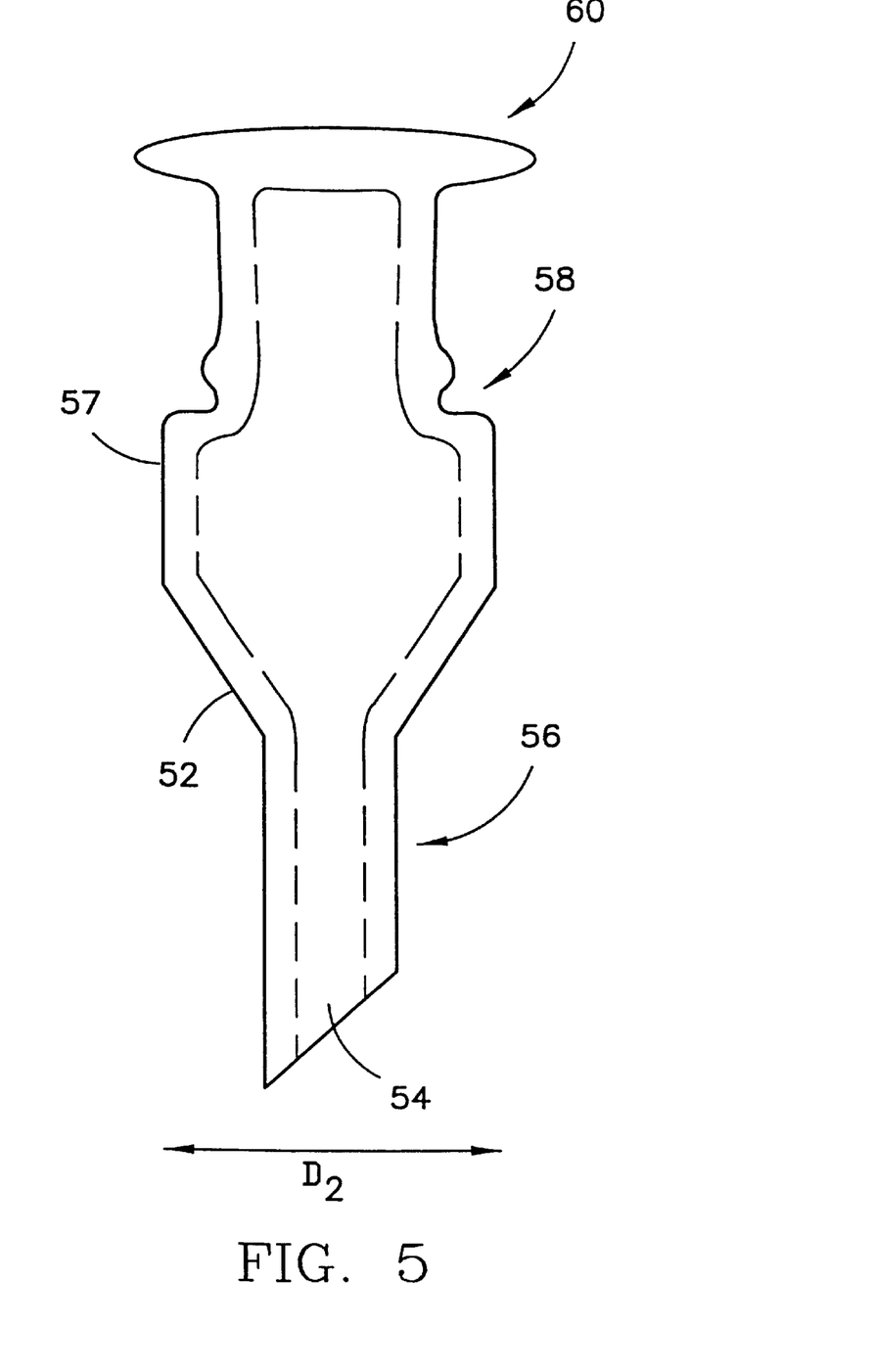
Figure 6:
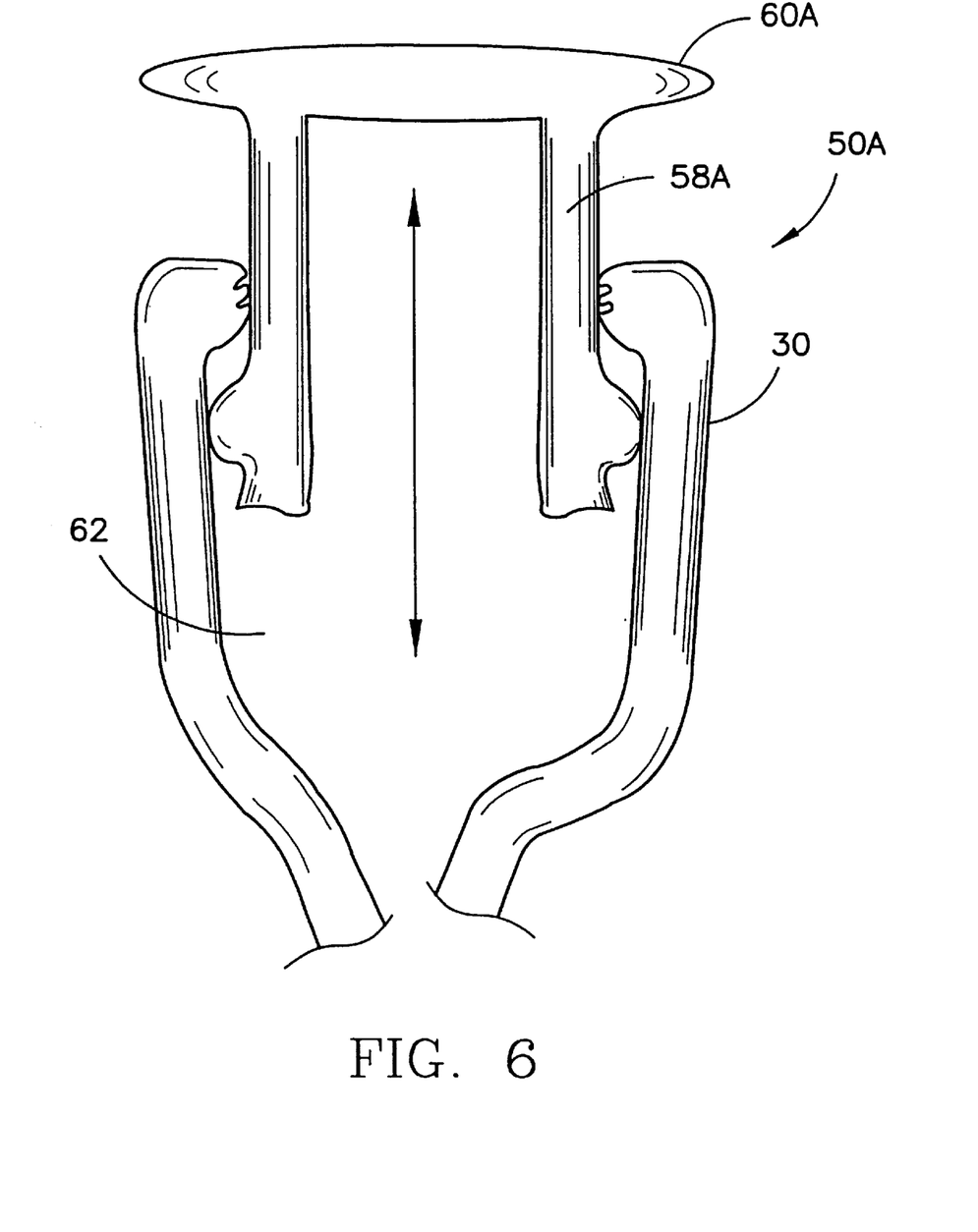

There is illustrated in FIGS. 5 and 6 a side view of a straw insert utilized in conjunction with a self-supporting transparent container of the present invention. As shown in FIG. 5, one aspect of the straw insert 50 has an elongate body 52, an aperture 54 therethrough, an insert portion 56, a spout portion 57, a breaking portion 58, and a knob 60. The insert portion 56 is inserted through the tear opening. To secure a liquid tight insert, the outside diameter of the insert portion 56, designated D2, should be $D2 \leq 2(D1/3.14)$. The diameter of the top part of the insert portion 56 is gradually increasing to provide a "natural stop." The spout portion 57 has a fairly constant diameter. The spout portion 57 protrudes from the container 30 and allows for pouring or drinking of the contents. The breaking portion 58 is broken to allow pouring or drinking of the contents from the spout portion 57. The knob 60 is above the breaking portion 58. The knob 60 may be gripped by a consumer and twisted, thereby breaking the insert 50 at the breaking portion 58 and allowing for removal of the knob 60. Removal of the knob 60 may allow for the pouring and drinking of the contents. As shown in FIG. 6, the knob 60 may then be placed within the spout portion 57 to reseal the container 30 thereby eliminating leakage of the contents.

One source for the clay mineral is Southern Clay Products, Inc. of Gonzales, Tex. which markets the clay mineral under the product name SCPX 1350 and SCPX 1351 which are particular formulations of the clay mineral and other minor components. However, those skilled in the art will recognize that many sources of the clay mineral are available and those sources may have their own particular formulations which are not outside the scope of the present invention.

The following Tables and Examples pertain to copending application Ser. No. 08/791,075, now abandoned, which pertinent parts are hereby incorporated by reference.

TABLE ONE

| Layer: | Comment: | Type: |
|---|---|---|
| PET | Suitable for Food Packaging Material | 48 Gauge Biaxially Oriented PET |
| SiOx | Suitable for Food Packaging Material | Plasma Enhanced Chemical Vapor DepositedSiOx |
| Printing Ink | Suitable for Food Packaging Material | Flexo , Max 8 colors Roto |
| Adhesive | Food Grade Adhesive | Adhesive for laminating LDPE film to SiOx surface Retort/Hot Fill specification |
| LDPE/LLDPE | Food Grade Polymers | 3.5 Mil thick blown film of LLDPE/LDPE blend: 75% LDPE, MFI: 0.7–0.8 25% C4 - LLDPE: MFI 0.8–1.0 |

Table One sets forth the specifications for one example of a flexible barrier material. The flexible barrier material has one heat sealable side for fabrication into a stand-up pouch. The flexible barrier material is transparent, has a high barrier, and is a laminate with reverse printed 48 Gauge PET/SiOx film suitable for tear opening or straw insert.

TABLE TWO

| PROPERTY | TEST | METRIC (SI) UNITS | VALUE | ENGLISH UNITS | VALUE |
|---|---|---|---|---|---|
| GAUGE | ASTM D374 | micron | 105 | Mil | 4.2 |

EXAMPLE ONE

TABLE THREE

| PROPERTY | TEST | METRIC (SI) UNITS | VALUE | ENGLISH UNITS | VALUE |
|---|---|---|---|---|---|
| WATER VAPOR TRANSMISSION | ASTM F1249 | gm/m² 24 h | 0.61 | gm/100 in²/24 h | 0.039 |

ASTM F1249 is a test for determining the rate of water vapor transmission through flexible barrier materials. The water vapor transmission rate is defined as the time rate of water vapor flow normal to the surfaces, under steady-state conditions, per unit area.

The test is conducted in a diffusion cell composed of a dry chamber and a wet chamber separated by the flexible barrier material to be tested. The diffusion cell is placed in a test station where the dry chamber and the top of the film are swept with dry air. Water vapor diffusing through the film mixes with the air and is carried into a pressure-modulated infrared sensor. This sensor measures the fraction of infrared energy absorbed by the water vapor and produces an electrical signal, the amplitude of which is proportional to water vapor concentration. This amplitude is compared to the amplitude of a calibration film for calculation of the transmission rate of the barrier material. The water vapor transmission test provides valuable information directly related to shelf life and packaged product stability.

The flexible barrier material of Table One demonstrated a water vapor transmission rate of 0.61 gm/m² per day. For comparison purposes only, Saran (1 mil) has a rate of 0.75 gm/m² per day and polyester (1 mil) has a rate of 7.69 gm/m² per day. Thus, the flexible barrier material has a relatively low water vapor transmission rate.

EXAMPLE TWO

TABLE FOUR

| PROPERTY | TEST | METRIC (SI) UNITS | VALUE | ENGLISH UNITS | VALUE |
|---|---|---|---|---|---|
| O2 Permeation | ASTM D3985 | cc/m² 24 hr (23° C. ,50% RH) (23° C. ,90% RH) | 4.3 4.3 | cc/100 in²/24 hr | 0.28 0.28 |

The ASTM D3985 test method covers a procedure for determination of the steady-state rate of transmission of oxygen gas through plastic films. The oxygen transmission rate is defined as the quantity of oxygen gas passing through a unit area of the parallel surfaces of a plastic film per unit time under the conditions of the D3985 test method.

The first step in the oxygen gas transmission test is to equilibrate the flexible barrier material in a dry environment (relative humidity less than 1%). The flexible barrier material is placed between two chambers at ambient atmospheric pressure. One chamber contains oxygen while the other is slowly purged by a stream of nitrogen. As oxygen gas permeates through the barrier material into the nitrogen chamber, the oxygen gas is transported to a coulometric detector where it produces an electrical current, the magnitude of which is proportional to the amount of oxygen flowing into the detector per unit time.

Figure 8:
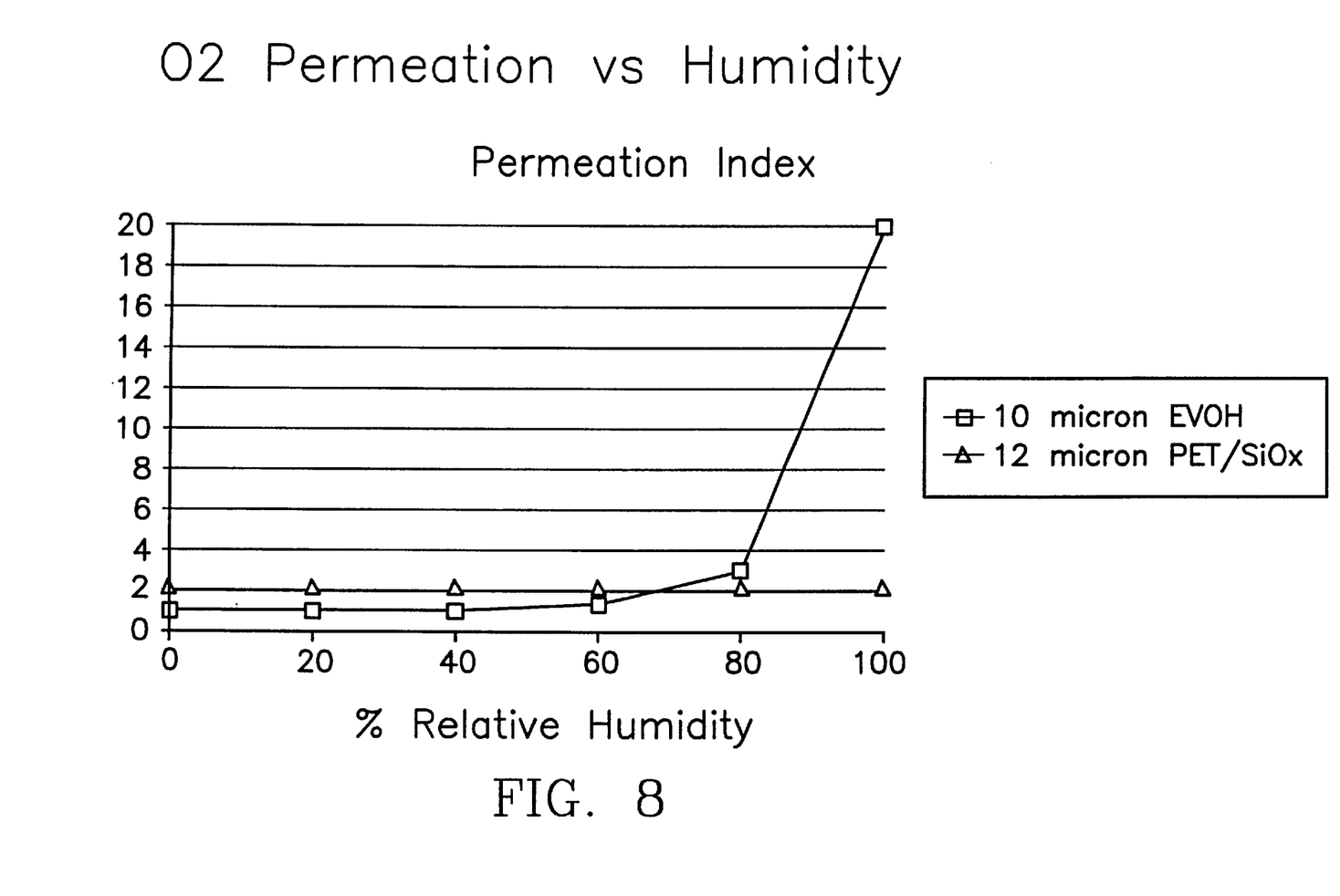
Figure 9:
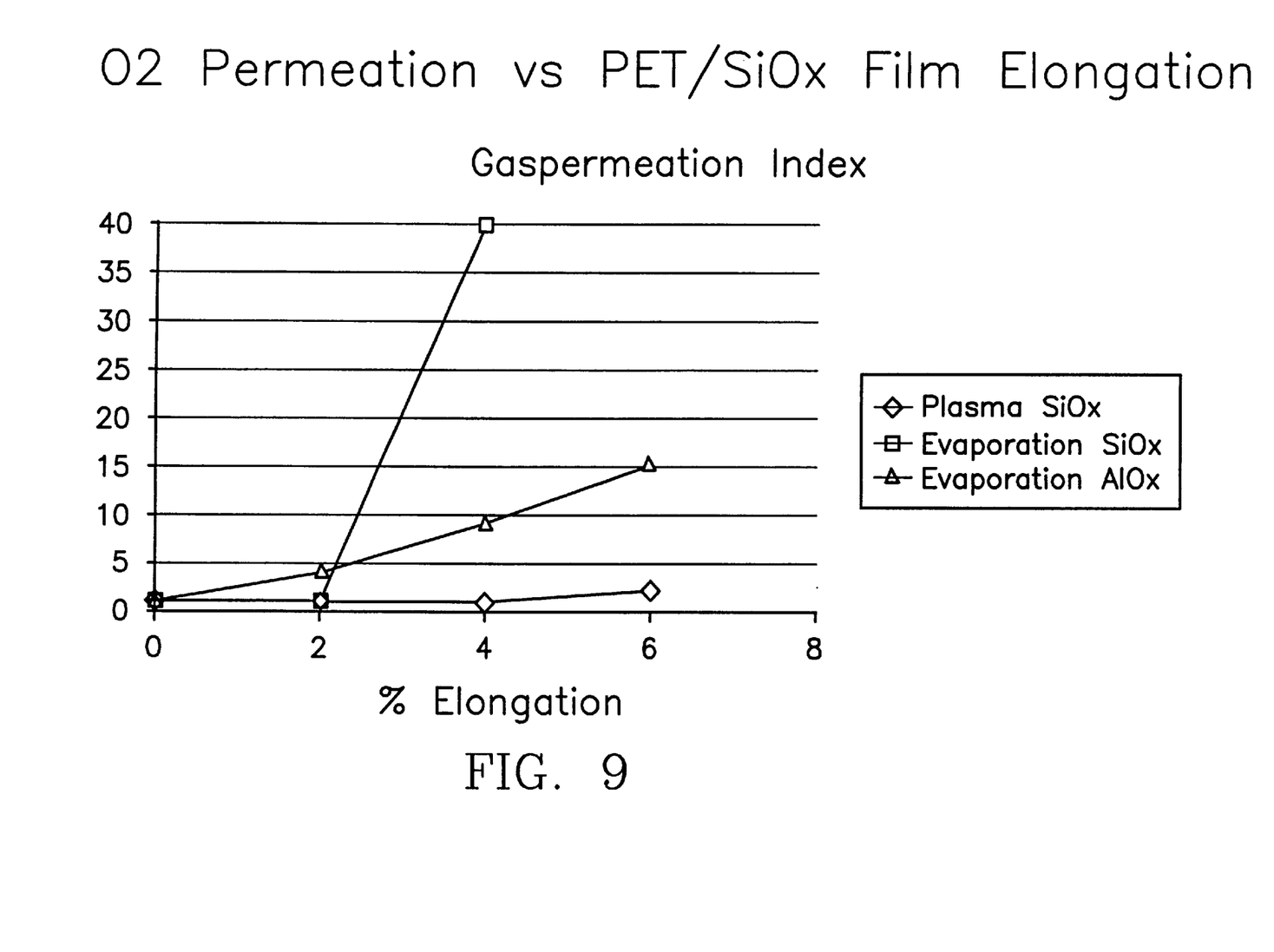
Figure 10:
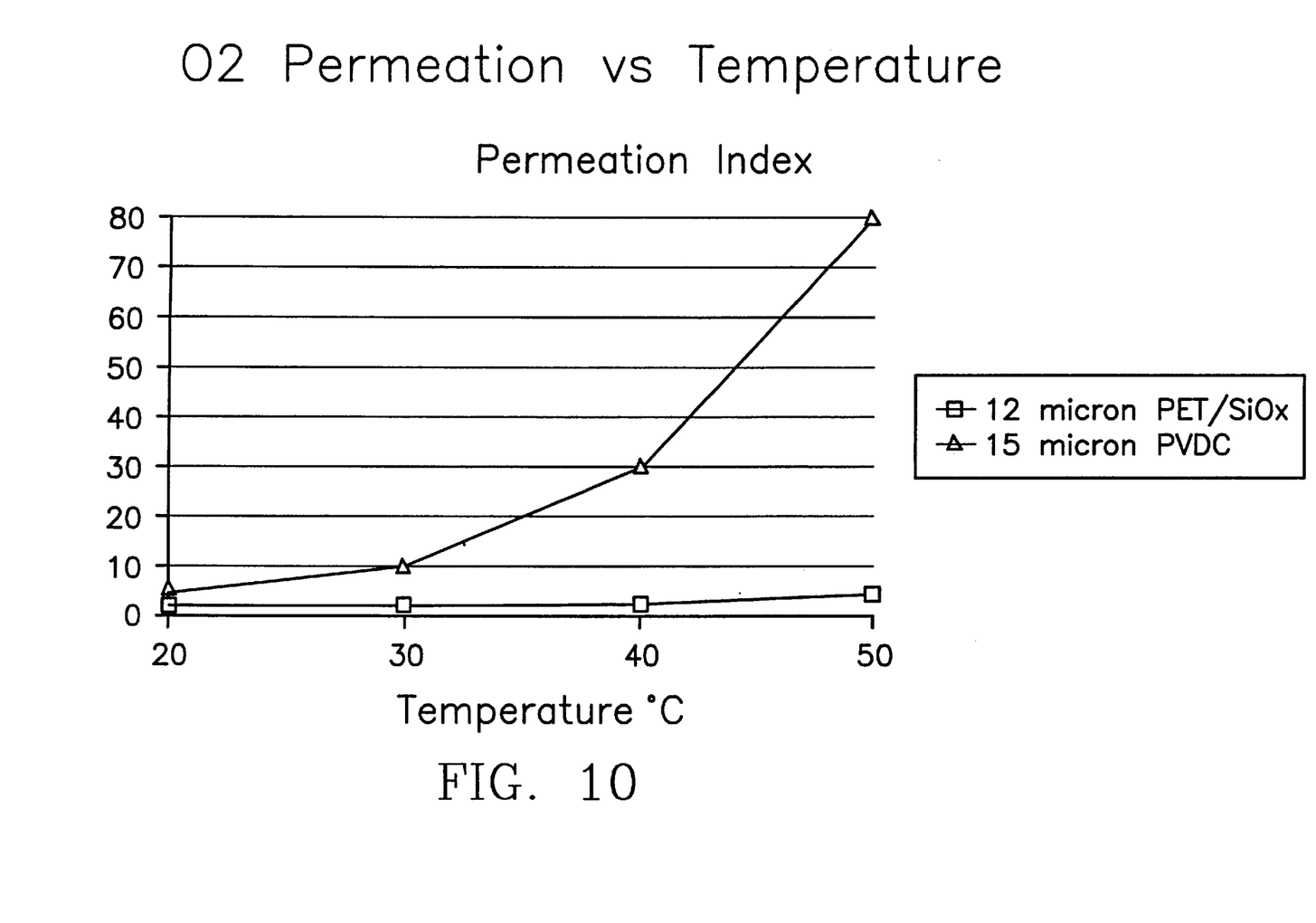

The flexible barrier material of Table One had an oxygen permeation of 4.3 cc/m² per 24 hour period. There is illustrated in FIG. 8 a graph of the oxygen permeation versus humidity for PET/SiOx compared to EVOH. There is illustrated in FIG. 9 a graph of oxygen permeation versus PET/MOx film elongation for three flexible barrier materials of the present invention. There is illustrated in FIG. 10 a graph of oxygen permeation versus temperature for PET/SiOx compared to PVDC.

EXAMPLE THREE

TABLE FIVE

| PROPERTY | TEST | METRIC (SI) UNITS | VALUE | ENGLISH UNITS | VALUE |
|---|---|---|---|---|---|
| GELBO FLEX: | F392 (23° C. ,75% RH) Cycles | cc/m² 24 hr | | cc/100 in²/24 hr | |
| | 0 | | 4.3 | | 0.28 |
| | 25 | | 4.7 | | 0.30 |
| | 50 | | 5.3 | | 0.34 |
| | 100 | | 5.8 | | 0.37 |

ASTM test method F392 is the standard test method for the flex durability of a flexible material. This test method covers the determination of the flex resistance of flexible barrier materials. Pinhole formation is the criterion presented for measuring failure, however other tests such as gas-transmission may be used as a substitute or complement to this test. Table Five illustrates the results from an oxygen permeation test to determine the flex resistance of the flexible barrier material.

In conducting the test, the flexible barrier material is flexed at standard atmospheric conditions. The flexing conditions and number of severity of flexing strokes may vary. The flexible barrier material of Table One was subjected to cycles of 25, 50 and 100. The flexing action consists of a twisting motion followed by a horizontal motion, thus, repeatedly twisting and crushing the film. The flexing action is performed by a Gelbo Tester which is available from United States Testing Co., Inc., of Hoboken, N.J. The frequency is at a rate of 45 cycles per minute. Flex failure is determined by measuring the oxygen permeation according to the procedure set forth in Example Two.

Figure 7:
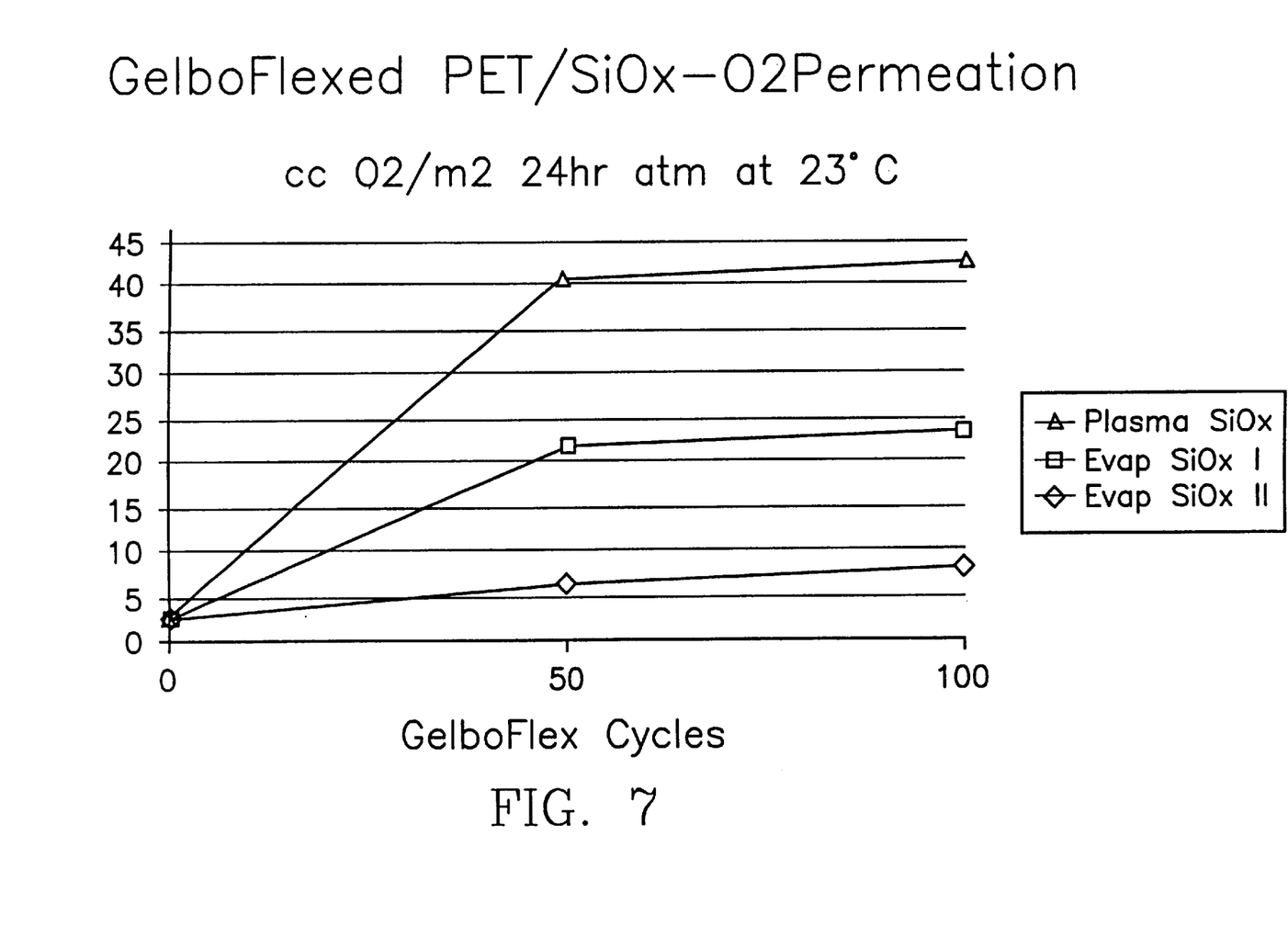

What is quite remarkable is the continued flexibility of the flexible barrier material of the present invention, even after being subjected to 100 cycles on the Gelbo tester. As illustrated in Table Five, the oxygen permeation only increases from 4.3 cc/m² 24 hr to 5.8 cc/m² 24 hr after 100 cycles. There is illustrated in FIG. 7 a graph of the Gelbo Flex testing of three flexible barrier materials of the present invention. The ability to maintain its flexibility is one of the most novel properties of the present invention. This persistent flexibility enables the flexible barrier material to be ideally utilized as a packaging material for pumpable foods. The persistent flexibility also enables the flexible barrier material to withstand adverse distribution conditions and still be in an acceptable condition for the final consumer.

EXAMPLE FOUR

TABLE SIX

| PROPERTY | METRIC (SI) UNITS | VALUE | ENGLISH UNITS | VALUE |
|---|---|---|---|---|
| ELONGATION AT BREAK | | | | |
| | MD % | 160 | MD % | 160 |
| | TD % | 230 | TD % | 230 |
| TENSILE STRENGTH AT BREAK | MD MPa | 32 | MD Kpsi | 4.7 |
| | TD MPa | 28 | TD Kpsi | 4.1 |
| TENSILE MODULUS | Kpsi | 135 | MPa | 925 |

Table Six provides the results of the tensile properties under ASTM D882 for the flexible barrier material of table one. The tensile properties tested by this test provide information on the tensile modulus, the tensile energy to break and the tensile strength of the flexible barrier material. The tensile modulus of elasticity is an index of the stiffness of the plastic. The tensile energy to break is the total energy absorbed per unit volume of the material up to the point of rupture.

EXAMPLE FIVE

TABLE SEVEN

| PROPERTY | TEST | METRIC (SI) UNITS | VALUE | ENGLISH UNITS | VALUE |
|---|---|---|---|---|---|
| COEFFICIENT OF FRICTION Static | ASTM D1894 | TD grams | | TD grams | |
| inside/metal | | 0.33 | | 0.33 | |
| outside/metal Kinetic | | 0.36 | | 0.36 | |
| inside/metal | | 0.29 | | 0.29 | |
| outside/metal | | 0.26 | | 0.26 | |

ASTM D1894 covers the determination of coefficients of starting and sliding friction of plastic film when sliding over itself or other substances. The coefficient of friction is defined as the ratio of the frictional force to the force, usually gravitational, acting perpendicular to the two surfaces in contact. This coefficient is a measure of the relative difficulty with which the surface of one material will slide over an adjoining surface of itself, or of another material. The static coefficient is related to the force measured to begin movement of the surfaces relative to each other. The kinetic coefficient is related to the force measured in sustaining this movement.

EXAMPLE SIX

TABLE EIGHT

| PROPERTY | TEST | METRIC (SI) UNITS | VALUE | ENGLISH UNITS | VALUE |
|---|---|---|---|---|---|
| TEAR STRENGTH | D1922 | MD grams | 290 | MD grams | 290 |
| | | TD grams | 270 | TD grams | 270 |

ASTM D1922 covers the determination of the average force to propagate tearing through a specified length of the plastic film. The force in grams required to propagate tearing across a film is measured using a precisely calibrated pendulum device. Acting by gravity, the pendulum swings through an arc, tearing the plastic film from a precut slit. The plastic film is held on one side by the pendulum and on the other side by a stationary member. The loss in energy by the pendulum is indicated by a pointer. The scale indication is a function of the force required to tear the plastic film.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A self-supporting transparent container for flowable materials, the self-supporting transparent container comprising:

an exterior film composed of a polymer material integrated with a clay mineral between 0.1% and 10% weight of the polymer material, the polymer material selected from the group consisting of polyamide, polyethylene terephthalate, copolymers of polyethylene terephthalate and mixtures thereof;

a metal oxide deposition on the exterior film having a thickness range of approximately 5 to approximately 500 nanometers and having a formula of $MO_x$ where x has a range of approximately 1.5 to approximately 2.5 and M is selected from the group consisting of silicon, aluminum and iron;

an interior film juxtaposed to the metal oxide deposition; and a flexible gusseted panel secured to a marginal portion of a plurality of side walls of the container and folded inwardly therebetween.

2. The self-supporting transparent container according to claim 1 further comprising a signage printed on the metal oxide deposition.

3. The self-supporting transparent container according to claim 1 wherein the exterior film has a thickness range of approximately 8 to approximately 20 microns.

4. The self-supporting transparent container according to claim 1 wherein the interior film has a thickness range of approximately 25 to approximately 150 microns.

5. The self-supporting transparent container according to claim 1 wherein the clay mineral is selected from the group consisting of smectite, vermiculite, halloysite, and any synthetic analog thereof.

6. The self-supporting transparent container according to claim 1 wherein the metal oxide deposition is deposited onto the exterior film through a process selected from the group consisting of plasma-enhanced chemical vapor deposition, metalorganic chemical vapor deposition, halide transport chemical vapor deposition, liquid atmospheric photo chemical deposition, electron beam evaporation, pulsed laser ablation, atomic layer epitaxy, ion implantation, molecular beam epitaxy and RF magnetron sputtering.

7. The self-supporting transparent container according to claim 1 wherein the interior film is selected from the group consisting of linear low density polyethylene, ultra low density polyethylene, metallocene linear low density polyethylene, low density polyethylene, medium density polyethylene, high density polyethylene, polypropylene, copolymers of polypropylene, copolymers of ethylene vinyl acetate and mixtures thereof.

8. The self-supporting transparent container according to claim 1 wherein the M is silicon.

9. The self-supporting transparent container according to claim 1 wherein the exterior film is biaxially oriented polyethylene terephthalate.

10. The self-supporting transparent container according to claim 1 wherein the interior film is a blend of linear low density polyethylene and low density polyethylene.

11. The self-supporting transparent container according to claim 1 further comprising a transverse seal having an unsealed area of a predetermined configuration.

12. The self-supporting transparent container according to claim 11 wherein the transverse seal has a tear notch for exposing the unsealed area while partially maintaining the transverse seal, the exposed unsealed area permitting the placement of an insertion for removing the contents of the self-supporting transparent container, the insertion corresponding in shape to the predetermined configuration of the unsealed area.

13. The self-supporting transparent container according to claim 12 wherein the straw insertion has an elongated body with an aperture therethrough, the elongate body further comprising an insert portion for penetration to the contents, a spout portion for dispensing a contents of the container, the spout portion disposed above the insert portion, and a knob disposed above the spout portion, the knob disengageable from the spout portion, the knob configured for placement within the spout portion to prevent leakage of the contents through the insert.

14. The transparent multilayer structure according to claim 1 wherein the clay mineral is a plurality of clay particles, each of the clay particles having a thickness of between 9 Angstroms and 100 nanometers, and an aspect ratio of between 100 and 2000.

* * * * *